Dec. 26, 1967 M. BENTELE 3,359,956
ROTOR CONSTRUCTION FOR ROTARY ENGINES
Filed April 19, 1966 3 Sheets-Sheet 1

INVENTOR.
MAX BENTELE
BY
ATTORNEY

Dec. 26, 1967   M. BENTELE   3,359,956
ROTOR CONSTRUCTION FOR ROTARY ENGINES
Filed April 19, 1966   3 Sheets-Sheet 3

INVENTOR.
MAX BENTELE
BY
ATTORNEY

United States Patent Office 3,359,956
Patented Dec. 26, 1967

3,359,956
ROTOR CONSTRUCTION FOR ROTARY ENGINES
Max Bentele, Ridgewood, N.J., assignor to Curtiss-Wright
Corporation, a corporation of Delaware
Filed Apr. 19, 1966, Ser. No. 543,659
10 Claims. (Cl. 123—8)

This invention relates to rotary combustion engines and is particularly directed to a means for permitting increases in the surface temperature of the combustion chamber walls for improving combustion in said engines. Reference may be made to United States Patent No. 2,988,065, issued June 13, 1961 to Felix Wankel et al., for a description of the basic structure and operation of the type engines referred to herein.

It is known in internal combustion engines that initiation of combustion and the combustion process itself are enhanced if the temperature of the walls of the combustion chamber can be increased. In rotary combustion engines, however, problems are encountered which are not present in reciprocating type engines when attempting to raise the combustion wall temperature. In rotary combustion engines operating on the Otto cycle, including carbureted engines and engines wherein the fuel is injected during the intake phase, at low load conditions, these engines are subject to relatively high specific fuel consumption and relatively high exhaust emission due to delayed combustion. At full load, these engines are also subject to relatively high heat dissipation to the cooling and lubricating oil which necessitates the use of an oil cooler. It will be apparent that these problems are normally not encountered in present day reciprocating type engines. Therefore, if the combustion wall temperature of rotary combustion engines could be raised, the rate of fuel evaporation would be increased so as to minimize the problem of delayed combustion, as well as ensuring more complete combustion of the fuel-air mixture, so that the specific fuel consumption could be lowered and the exhaust emission minimized. Further, at the same time, if the heat transfer across the rotor walls could be decreased, the heat dissipation of the cooling and lubricating oil, which is preferably circulated through the rotor interior, could be lowered so that the size of the oil cooler would be substantially decreased.

In rotary combustion engines of the multi-fuel type, such as those shown in United States Patents 3,196,852 issued July 27, 1965 and 3,246,636 issued April 19, 1966, the fuel is injected as a film onto a rotor working face for controlled evaporation of the fuel. In the device of Patent No. 3,246,636, it is intended that ignition be initiated at substantially the same time as evaporation of the first increment of fuel film from the working face takes place. It will be apparent, therefore, that if fuel evaporation does not occur relatively rapidly, ignition may be somewhat delayed. Thus, it is also an advantage to increase the rotor surface temperature in this type of engine to bring about rapid evaporation of the fuel film sprayed onto the rotor face.

Rotary combustion engines do not lend themselves to the relatively simple solutions of raising the combustion wall temperature that are available in reciprocating combustion engines. In rotary combustion engines wherein the inner surface of the rotor housing and the end housings, and a working face of the rotor make up the walls of the combustion chamber, increases in the combustion wall temperature are limited to the working face of the rotor, since the inner faces of the rotor housing and end housings are in rubbing contact with the engine seal structures and seal lubrication and wear considerations must be taken into account. However, it is not possible in previous type rotor constructions to merely increase the mean temperature of the rotor. For example, in aluminum and cast iron rotors, when the mean rotor temperature is increased problems of thermal distortion, increased thermal stresses, coking of the oil, engine seal sticking and reductions in material properties are encountered.

In accordance with the present invention, means are provided which permit an increase in the surface temperature of the rotor for increasing fuel evaporation and combustion efficiency while at the same time providing an insulating cover on the rotor surface which minimizes heat transfer into the rotor interior and thus lowers the oil cooling requirements. The invention provides for a decrease in specific fuel consumption and exhaust emission at part load operating conditions by avoiding delayed combustion and permits operation on a wide variety of fuel which advantages were not always heretofore possible in rotary combustion engines. As will be apparent hereinafter, the solution presented by the invention requires a relatively simple modification of previously known structures and makes possible the elimination of relatively complicated known type accessory devices for increasing the temperature of the fuel-air mixture such as, for example, air and/or fuel preheating devices carried outside of the main engine structure.

The invention is generally carried out by providing a coating on each working face of the rotor which coating has a relatively low thermal conductivity so that heat transfer from the combustion zone through the rotor walls is minimized. At the same time, the coating provides a high rotor surface temperature area due to its relatively low thermal conductivity which promotes evaporation of the liquid fuel supplied to the working chambers of the engine. Thus, when ignition of the fuel-air mixture in a working chamber is initiated, a substantial portion of the fuel-air mixture will be vaporized for insuring substantially complete combustion of the entire fuel-air mixture. As is well known, complete combustion of the fuel-air mixture not only promotes or increases fuel economy but also reduces the amount of unburnt hydrocarbons and other contaminants in the engine exhaust for minimizing pollution of the atmosphere from the exhaust products.

Accordingly, it is one object of the invention to provide a high temperature combustion wall surface for the working chambers of a rotary combustion engine.

It is a further object of the invention to provide a novel construction wherein combustion efficiency is increased.

It is another object of the invention to provide a novel rotor construction wherein heat transfer into the rotor interior is minimized and thus minimizes the size of the engine oil cooling structure.

It is an additional object of the invention to provide a novel and improved rotor construction which enhances combustion in the working chambers thereof and minimizes the presence of contaminants in the exhaust product of said engine.

It is still another object of the invention to provide a novel and improved rotor construction wherein means are provided for increasing combustion efficiency and for minimizing heat transfer from the combustion zone of the engine through the rotor walls and into the rotor interior.

It is still a further object of the invention to provide a novel and improved rotor construction which eliminates outside accessories for raising the temperature of the engine air and/or fuel mixture.

It is still an additional object of the invention to provide a novel and improved construction for the rotor in a rotary combustion engine wherein combustion delays are avoided and operation on a wide variety of fuels is possible.

Other objects and advantages of the invention will be best understood upon reading the following detailed description with the accompanying drawings wherein:

FIG. 4a is a plan view of the rotor face taken in the direction of line 4a—4a.

Figures 1, 3:
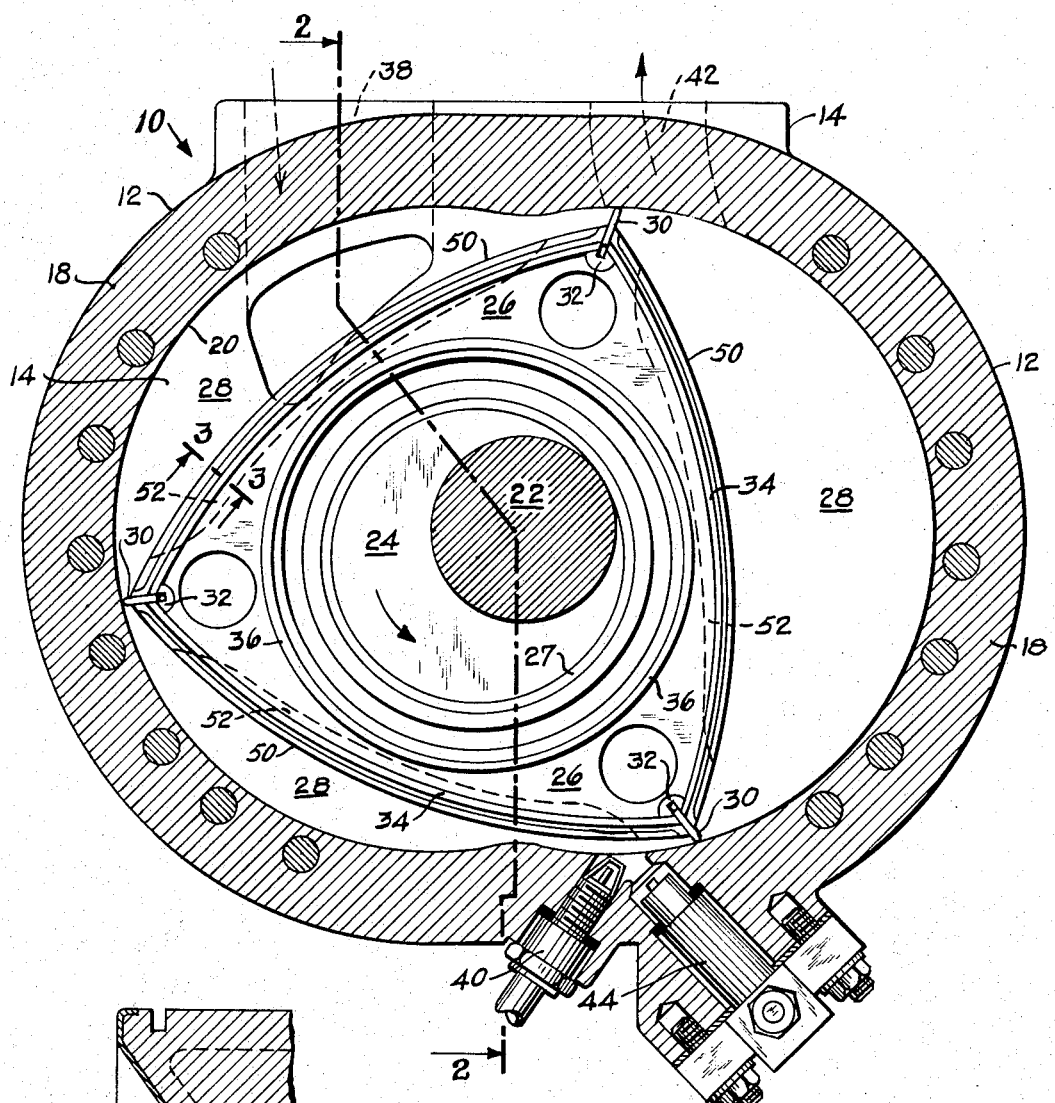
FIG. 1 is an end view of a rotary combustion engine embodying the invention with one of the end walls removed.
FIG. 3 is a sectional view of the rotor of FIG. 1 taken along line 3—3 of FIG. 1.
Figure 2:
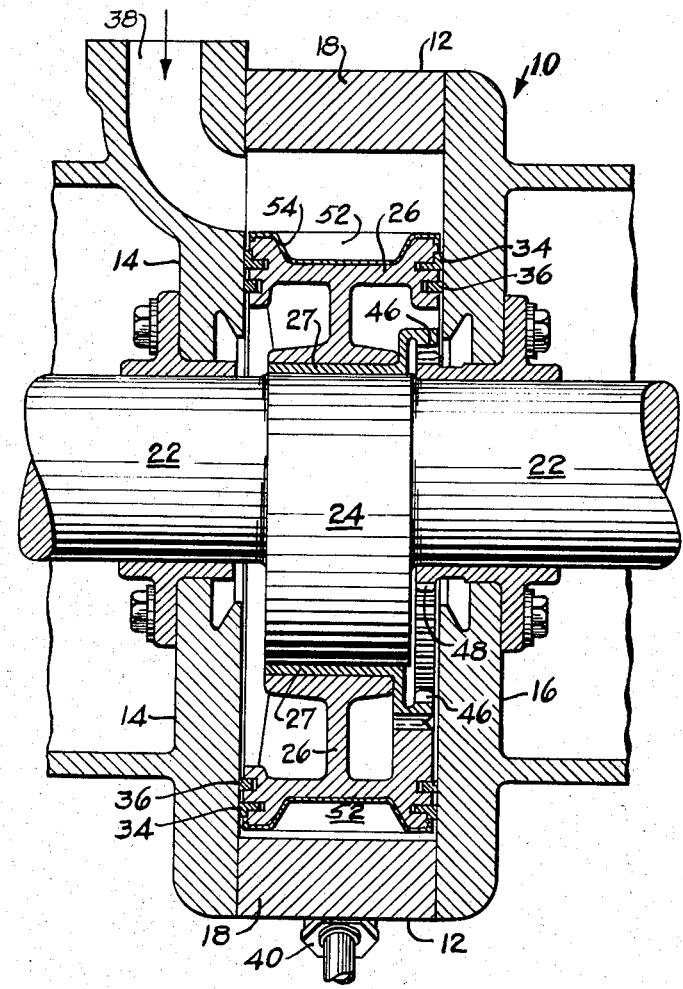
FIG. 2 is an axial section view taken along line 2—2 of FIG. 1.

Referring to FIGS. 1 and 2, there is shown therein a rotary internal combustion engine generally indicated by reference numeral 10 which comprises an outer body 12 having axially-spaced end walls 14 and 16 and a peripheral wall 18 interconnected with said end walls to form a cavity therebetween. As shown in FIG. 1, the profile of the inner surface 20 of the peripheral wall preferably has a multi-lobed shape which may be defined as being basically an epitrochoid.

A shaft 22 is coaxially supported in the outer body 12 which shaft has an eccentric portion 24 thereon upon which a rotor 26 is rotatably supported by a suitable bearing 27. The rotor 26 is provided with a plurality of circumferentially-spaced apex portions for sealing engagement with the inner surface 20 of the peripheral wall to form a plurality of working chambers 28 therebetween. As illustrated, the rotor is provided with three apex portions when used with a two-lobed outer body, but it should be understood that other combinations are possible and the invention is not limited to the specific arrangement shown. In order to maintain sealing for the working chambers 28, each apex portion is provided with an apex seal member 30 for sealing engagement with the inner surface 20 of the peripheral wall which apex seal member is disposed in a groove in its associated apex portion. Each apex seal member mates with an intermediate seal member 32 also disposed in a groove in the apex portion and with side face seal members 34 carried by each side face of the rotor whereby the seal members 30, 32 and 34 make up a continuous seal for each of the working chambers 28. The rotor itself has a hollow construction and, as briefly mentioned above, the rotor is preferably liquid cooled by a supplying system for providing cooling oil to the hollow interior of the rotor. In order to prevent the cooling oil from the rotor and the lubricating oil from the shaft bearings from leaking outwardly into the working chambers, an annular oil seal 36 is provided in each side face of the rotor radially inwardly of the side face seals 34.

In the embodiment illustrated, the outer body 12 is preferably stationary while the inner body or rotor 26 rotates relative to said outer body whereupon the working chambers 28 vary in volume. An intake port 38 is provided in one or both of the end housings, as illustrated, or in the peripheral wall 18 for supplying air or a fuel-air mixture to the working chambers 28, and an ignition means, comprising a spark plug 40, may be provided for igniting the fuel-air mixture in the working chambers 28. An exhaust port 42 is also provided for discharging the burnt gases from the engine. The engine may be provided with a carburetor for supplying fuel along with the air through the intake port 38, or preferably, as illustrated in FIG. 1, a fuel injection nozzle 44 is provided which provides a timed spray of fuel into a working chamber 28. Reference may be made to co-pending application Ser. No. 450,246, filed Apr. 15, 1965, now U.S. Patent No. 3,246,636, issued Apr. 19, 1966, for a more detailed description of the operation of the fuel injection system in an engine of this type. It will be apparent that, during engine operation, the working chambers 28 each have a cycle of operation including the four phases of intake, compression, expansion and exhaust. In order to maintain the relative motion of the rotor 26 with the stationary outer body, an internally-toothed gear 46 is coaxially secured to the rotor 26 and is disposed for meshing engagement with a fixed gear 48 suitably secured to an outer body end wall. It should be understood, however, that the outer body 12 as well as the inner body 26 may rotate instead of only one of said bodies rotating.

Referring again to FIG. 1, it will be seen that rotor working faces 50 are defined between adjacent apex portions of the rotor 26, each of which defines a wall of a working chamber 28 made up of said working face 50, the inner surface 20 of the peripheral wall, and the inner surfaces of each end wall 14 and 16. Each of the rotor working faces 50 will be exposed to the combustion phase as the rotor rotates into a position adjacent the spark plug 40 and the fuel injector 44 whereupon a substantial amount of heat will be generated. Since the rotor is preferably made of metal such as cast iron or aluminum, heat will be transferred to the main rotor body and may cause thermal distortions, thermal stresses, coking of the oil, seal sticking, etc. which can effect the bearing and seal clearances and the overall engine performance. It will be apparent therefore that it is important to maintain the mean temperature of the rotor at a desired level to minimize these undesirable effects. As stated above, the rotor interior is preferably liquid cooled in its interior for carrying heat away from the rotor interior. At the same time, as explained above, it is also desirable to raise the temperature of the rotor surface in order to promote combustion efficiency. It will therefore be seen that these two aims, that is minimizing the size of the oil cooler for cooling the engine oil and increasing the surface temperature of the rotor, work against one another to a certain degree. However, it is the prime purpose of the invention to provide a means wherein the rotor surface temperature can be increased while at the same time minimizing heat transfer into the rotor interior so that the oil cooling requirements can be minimized.

Figure 4:
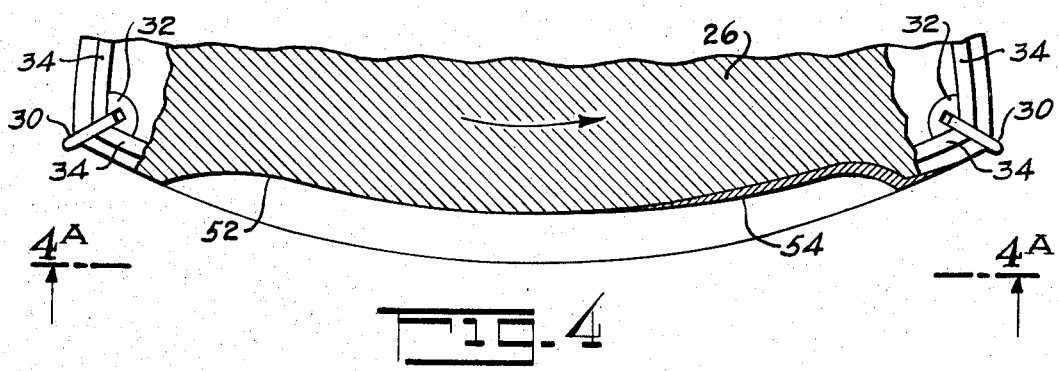
FIG. 4 is a partial sectional view showing another embodiment of the invention.

In order to carry out the prime purpose of the invention, the rotor 26 which may be either cast iron or aluminum is provided with a coating of material which has a relatively low thermal conductivity. Preferably the rotor is coated with zirconium oxide which has the thermal conductivity of 8 B.t.u./ft.$^2$/in./hr./° F. Other materials having similar properties to zirconium oxide for the intended purpose are also applicable, such as, oxides of aluminum, nickel and the rare earth metals including cerium and lanthanum, carbide compounds of chromium, tungsten and silicone, and silicates of aluminum, magnesium and zirconium. Referring to FIGS. 3 and 4, as can be seen in FIG. 3, the coating is preferably applied across the entire width of the rotor, especially in the region of the recess portion 52 provided in each working face 50 for permitting transfer of gases across the lobe junctions of the outer body peripheral wall during relative rotation of the rotor. The coating in the recess portion is preferably of a thickness in the range of .025 to .035 inch thick and may be of somewhat lesser thickness at the axially outer portions of the rotor. If desired, a relatively thin coating of a bonding material such as molybdenum may be provided which has good bonding characteristics with the aluminum or cast iron rotor and the coating.

As stated above, preferably the entire rotor working face area is coated in order to provide an insulating layer for the rotor. In operation, the interior of the rotor will be kept relatively cool due to the insulating properties of the coating so that the amount of cooling oil supplied to the interior of the rotor can be substantially reduced. This of course will result in reducing the weight of the liquid carried by the rotor and an accompanying reduction in the size cooling oil supply system including the oil cooler (not shown). Further, due to the fact that the coating will absorb a substantial amount of the heat of combustion, when fuel is supplied to a working chamber either by carburetion or by injection such as through nozzle 44, evaporation of the liquid fuel will be enhanced due to the increase in temperature thus providing a combustible gaseous mixture of raised temperature which will promote substantially complete combustion of all the fuel and air in the combustion chamber. Because the cooling requirements for the rotor are not as great, there will also be less of a chance of the walls of the rotor being overcooled so that quenching of the combustible mixture will not occur. The fact that the hot surface provided by the coating promotes complete combustion is also advantageous for minimizing the passing of unburnt hydrocarbons and other cracked products of partial combustion into the atmosphere through the exhaust port. The coating on the rotor therefore advances one solution to the problem of air pollution caused by exhaust products.

Figure 4A:
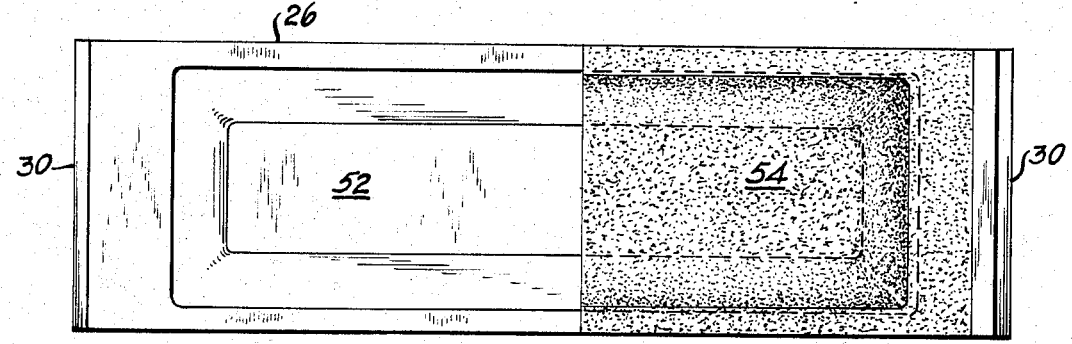
Figure 4A:

In FIGS. 4 and 4a there is shown another embodiment wherein the major object is to take advantage of the high surface temperature characterstics provided by the coating. In the embodiment of FIGS. 4 and 4a only a portion of the recess portion 52 of each working face 50 is provided with a coating of the type explained above. In this embodiment the coating is preferably located in the region which will receive the first increments of liquid fuel injected thereon or supplied through carburetion. It has been found that the liquid fuel will initially adhere to the coating provided by the invention and as the rotor rotates the temperature of the coating will cause the liquid fuel to relatively rapidly evaporate to make said fuel more readily mixable with the air in the chamber so that the combustible mixture will be easily ignitable. As is well known in combustion engines, if the evaporation of the liquid into a gaseous mixture can be enhanced, the combustion efficiency can be improved. Thus, through the coating 54 which provides a localized high temperature surface on the rotor, evaporation will be improved with resulting improvement in the combustion efficiency.

Figure 5:
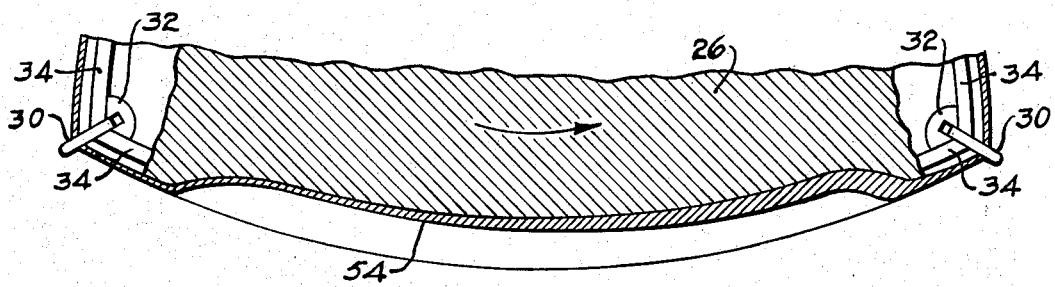
FIG. 5 is a view similar to FIG. 4 and showing still another embodiment of the invention.
Figure 5:

FIG. 5 shows still another embodiment of the invention. In the embodiment of FIG. 5, the entire rotor peripheral surface is coated with the relatively low thermal conductive material similar to FIGS. 1–3. However, in the embodiment of FIG. 5, it will be seen that the thickness of the coating varies so that it is thicker in the area of the leading portion of the combustion chamber cutout or recess 52 than toward the trailing portion. The thickness of the coating has been exaggerated for purposes of illustration. Through this construction, similar to FIGS. 4 and 4a, there will be a relatively hotter surface area in the leading portion of the chamber wherein the fuel is initially deposited and wherein there is a shorter time available for evaporation of the fuel. Also, as is known, the air charge will be at a relatively lower temperature at this time since it is relatively near the beginning of the compression phase. Therefore, the localized relatively hotter region, brought about by the thicker portion of the insulating coating, will promote relatively rapid evaporation of the liquid fuel and raise the temperature of the fuel air mixture for enhancing combustion.

It will be seen from the above description that a novel and improved rotor construction is provided wherein the rotor surface temperatures can be substantially increased for promoting evaporation of the liquid fuel supplied to the engine while at the same time reducing heat transfer into the interior of the rotor and thus reducing the engine oil cooling requirements. While the invention is relatively simple in construction, it provides significant improvements in the art of rotary internal combustion engines as well as a means of providing a solution to the problem of air pollution by reducing the contaminants ejected into the atmosphere with the exhaust products of the engine.

While the invention has been described in detail in its preferred embodiments, it will be obvious to those skilled in the art, after understanding the invention, that various changes and modifications may be made therein without departing from the spirit or scope thereof. For example, the thickness and extent of the coating may be varied according to the desired operation.

What is claimed is:

1. In a rotary combustion engine, a rotor supported in a hollow outer body for relative rotation therewith, said rotor including a peripheral wall having an outer peripheral surface with said outer peripheral surface being periodically exposed to combustion temperatures during relative rotation of said rotor; and said outer peripheral surface including a coating disposed on at least a portion of said rotor peripheral wall with said coating being composed of a material having a relatively low thermal conductivity for minimizing heat transfer to said rotor outer peripheral wall surface such that the effective temperature of the outer surface of said rotor may be increased without substantially increasing the temperature of the rotor interior.

2. In a rotary combustion engine as recited in claim 1 wherein said coating is composed of a material selected from the group consisting of oxides of zirconium, aluminum, nickel, cerium and lanthanum, carbides of chromium, tungsten and silicone, silicates of aluminum, magnesium and zirconium.

3. In a rotary combustion engine as recited in claim 1 wherein said coating is composed of zirconium oxide.

4. In a rotary combustion engine as recited in claim 3 wherein an intermediate coating is provided between said rotor and said coating of zirconium oxide with said intermediate coating having good bonding characteristics with said rotor and said coating of zirconium oxide.

5. In a rotary combustion engine as recited in claim 4 wherein said intermediate coating is composed of molybdenum.

6. In a rotary combustion engine as recited in claim 1 wherein said rotor peripheral wall includes a plurality of working faces with each said working face defining a wall of an associated engine combustion chamber and each said working face including a recess formed therein, and said coating being disposed on only a portion of the surface of said recess such that during engine operation said coating portion forms a region of increased temperature for promoting fuel evaporation in the engine combustion chamber.

7. In a rotary combustion engine as recited in claim 6 wherein said rotary combustion engine includes fuel injection means, and said coating portion being disposed on the surface region of said working face recess which is initially wetted by fuel from said fuel injection means upon initiation of injection of fuel into an associated combustion chamber.

8. In a rotary combustion engine as recited in claim 6 wherein said coating portion is disposed on a leading portion of said working face recess relative to the direction of rotation of said rotor.

9. In a rotary combustion engine as recited in claim 1 wherein said rotor peripheral wall includes a plurality of working faces with each said working face defining a wall of an associated engine combustion chamber and each said working face including a recess formed therein, and said coating having a relatively greater thickness at least on a leading portion of said working face recess relative to the direction of rotation of said rotor than on a trailing portion thereof for enhancing evaporation of fuel contained in the leading portion of a working chamber prior to combustion thereof.

10. In a rotary combustion engine as recited in claim 9 wherein said coating has a relatively greater thickness in the region of said working face recess which is initially wetted by fuel from said fuel injection means upon initiation of injection of fuel into an associated combustion chamber.

References Cited

UNITED STATES PATENTS

| 3,115,871 | 12/1963 | Luck | 123—8 |
| 3,289,649 | 12/1966 | Lamm | 123—8 |
| 3,318,515 | 5/1967 | Jones | 123—8 |

RALPH D. BLAKESLEE, *Primary Examiner*.